US012755197B2

(12) United States Patent
Shanker et al.

(10) Patent No.: US 12,755,197 B2
(45) Date of Patent: Oct. 6, 2026

(54) ENHANCED DATA LABELING FOR MACHINE LEARNING TRAINING

(71) Applicant: Capital One Services, LLC, McLean, VA (US)

(72) Inventors: Purva Shanker, Arlington, VA (US); Shannon Yogerst, New York, NY (US); Tania Cruz Morales, Washington, DC (US); Haytham Yaghi, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 899 days.

(21) Appl. No.: 18/150,609

(22) Filed: Jan. 5, 2023

(65) Prior Publication Data

US 2024/0232699 A1 Jul. 11, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 11,868,437 | B1 * | 1/2024 | Burnham | G06V 10/774 |
| 2010/0312725 | A1 * | 12/2010 | Privault | G06N 5/043 706/54 |
| 2018/0113997 | A1 * | 4/2018 | Tanigawa | G06T 7/11 |
| 2020/0057961 | A1 * | 2/2020 | Vahdat | G06N 20/00 |
| 2022/0121656 | A1 * | 4/2022 | Zheng | G06F 16/24522 |
| 2022/0207303 | A1 * | 6/2022 | Barkan | G06F 18/2411 |
| 2023/0281387 | A1 * | 9/2023 | Selvakumar | G06F 40/284 |
| 2023/0342411 | A1 * | 10/2023 | Popat | G06F 16/9538 |

* cited by examiner

*Primary Examiner* — Jennifer N Welch
(74) *Attorney, Agent, or Firm* — Foley & Lardner LLP

(57) ABSTRACT

Embodiments relate to enhancing data labeling for machine learning model training using context data. The context data is provided to data labelers to improve accuracy of labels assigned by the data labelers, such as those assigned for ambiguous or unclear target objects. In an example, a system determines and provides context sets for target objects at user devices. The system generates a first training dataset and a second training dataset with labels obtained in connection with a first subset and a second subset of the context sets, respectively. The system trains a first and second instance of a machine learning model on the first training dataset and the second training dataset, respectively, and determines a respective accuracy score for the model instances. If the first instance is more accurate than the second instance, the system generates subsequent context sets based on characteristics of the first subset of context sets.

19 Claims, 5 Drawing Sheets

ENHANCED DATA LABELING FOR MACHINE LEARNING TRAINING

BACKGROUND

Across various techniques, training of a machine learning model involves the use of training datasets that ascribe interpretable meaning to different data inputs for the model. Inaccuracies in training datasets lead to deficiencies in model accuracy and performance; incorrect or inaccurate meanings being taught to the model result in incorrect and inaccurate model outputs. For example, such inaccuracies arise with data inputs that have ambiguous meanings or interpretations, which cause confusion when generating the training datasets. Such challenges with model training lead to operational inefficiencies during labeling and training processes, as errors in training datasets need to be corrected and clarification for ambiguous data needs to be provided. These and other technical challenges exist.

SUMMARY

Embodiments described herein address technical challenges related to training of machine learning (ML) models, and, in particular, to creation of accurately labeled training datasets used in the training of machine learning models. Embodiments described herein provide solutions that improve the accuracy of training datasets—and the resulting accuracy of trained ML models—based on disambiguating and providing context surrounding the target data being labeled when creating a training dataset. With the benefit of the provided context, data labelers tasked with generating a training dataset can more accurately and efficiently assign labels to the target data for the training dataset. Accordingly, such technical improvements related to the creation of training datasets may improve efficiency of model training pipelines and improves accuracy of models trained on improved training datasets.

In particular, embodiments described herein involve evaluation or measurement of the efficacy of different context sets in order to create optimal or improved context sets that are provided to data labelers during labeling tasks. According to various embodiments, different context sets may be intelligently created and distributed to different data labelers such that the effects of the different context sets can be observed with respect to model accuracy and performance. In some embodiments, the different context sets may include different context data objects, different numbers of context data objects, context data objects specific or related to a data labeler, context data objects specific or related to the ML model being trained, and/or the like. These characteristics or parameters may be between context sets provided to different data labelers, such that characteristics or parameters that are effective to model accuracy and performance can be identified and propagated to subsequent and improved context sets.

The efficacy evaluation or measurement of different context sets may involve the generation of training datasets each including labels that resulted from a different subset of context sets. Instances of a ML model may each be trained on a different training dataset, and the model instances may be tested to determine which training dataset resulted in a desired model accuracy and performance. For such a training dataset, the characteristics or parameters of the subset of context sets associated with the training dataset may be determined to be effective and may then be used in the creation of subsequent context sets. In various embodiments, these subsequent context sets may be used for further iterations of context set improvement, for training a ML model for deployment, for building a second ML model that automatically creates context sets for a model training operation, and/or the like.

Thus, various embodiments provide technical improvements and solutions in the field of ML models. Data labelers may be provided with improved contextual information that facilitates accurate labeling and creation of training datasets. The improved contextual information may be specifically and intelligently selected to include context objects that have an effect on downstream model accuracy and performance, and thus, ineffective and low-impact context may not be distributed to data labelers. In this way, the efficacy evaluation of context may enable both filtering for relevant context objects and reduction of context data volume being transmitted to user devices. Similarly, the efficacy evaluation of context may enable improved security, for example, when sensitive context objects are determined to have an insignificant effect on model accuracy and performance. In various embodiments, improved training datasets may result in improved ML models that are not confused by ambiguous model inputs and that can be tuned to provide domain-specific outputs.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Embodiments described herein improve and enhance data labeling for ML model training based on intelligently providing context related to the data being labeled. The provided context may enable data labelers (e.g., human users that manually assign labels to target objects, models that automatically assign labels and create datasets) to create accurate training datasets and training datasets tuned for a specific domain and/or use case of a ML model. As an illustrative example, a data labeler may be tasked with labeling a target utterance that includes the word balance in relation to training a ML model for natural language. The data labeler may be confused due to the ambiguity of the word balance and its multiple domain-specific meanings, and incorrect labeling due to the confusion would lead to a loss of accuracy at the ML model. When provided with specific context objects related to the target utterances, the data labeler more accurately assigns a label to the target utterance. For example, the context objects may include definitions of the word balance, a list of possible ML model outputs, a set of possible labels to assign to the target utterance, and/or the like. Embodiments described herein relate to creating context sets (e.g., including such context objects) to support and facilitate accurate data labeling and efficient creation of training datasets.

Beyond the above-described illustrative example, embodiments described herein provide technical improvements for ML models in various different domains. For example, context may be provided to create enhanced training datasets for image classification ML models, audio or signal processing ML models, interactive voice response (IVR) and/or conversational ML models, and/or the like. In a different example domain, context sets for enhancing data labeling for an image classification ML model may context objects such as image segmentations or regions of interest (ROIs) that are adjacent to or near a target ROI, image metadata such as a timestamp or a location, and/or the like. Thus, based on a domain associated with a ML model being trained, different context objects may be provided to enhance data labeling and improve training (and domain specificity) of the ML model.

Figure 1:
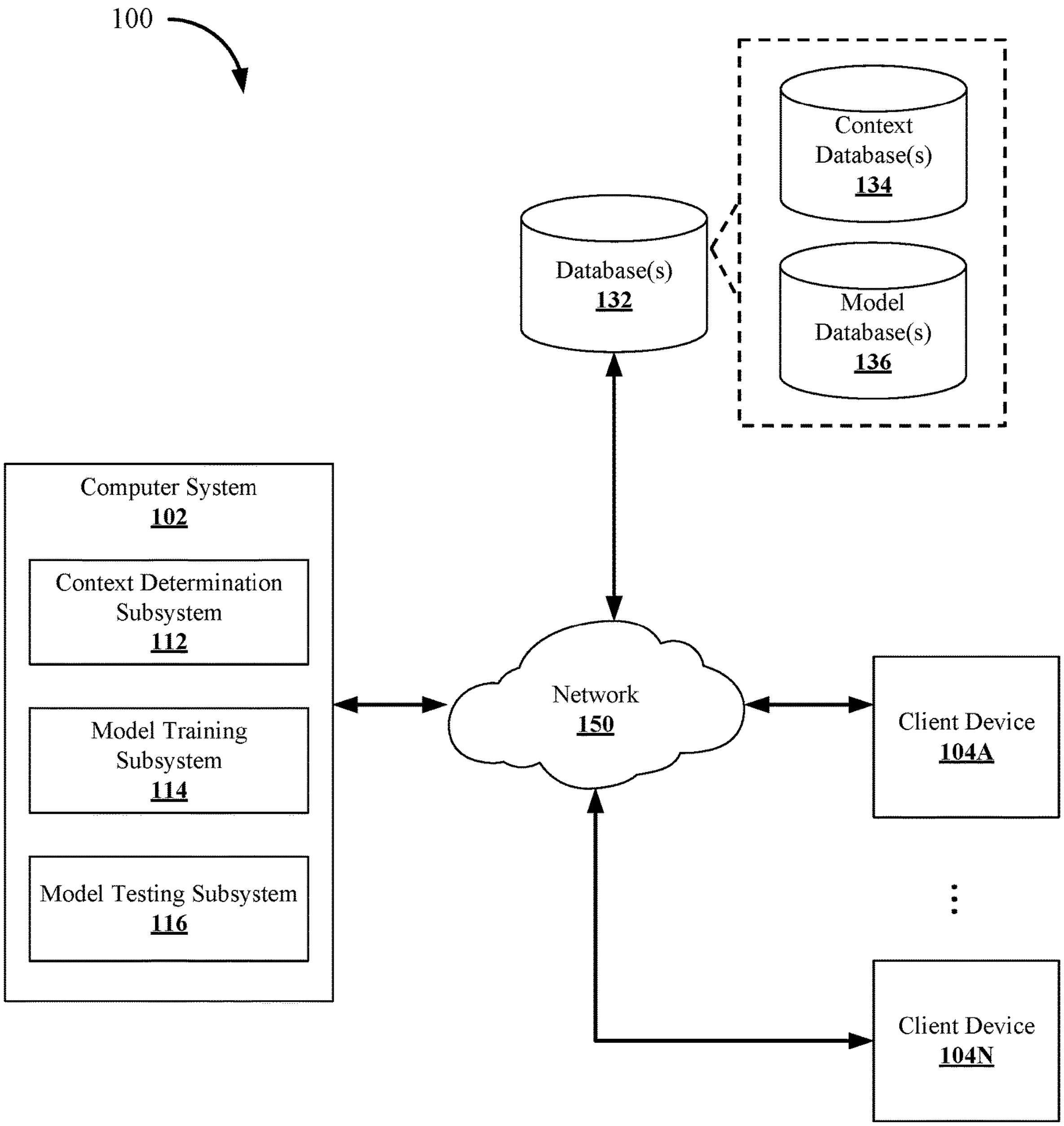
FIG. 1 shows an example system for enhancing data labeling for machine learning training, in accordance with one or more embodiments.

FIG. 1 shows an example of a system 100 for enhancing data labeling with context sets for ML model training, in accordance with one or more embodiments. In some embodiments, a context set may include one or more context objects that provide contextual data information related to one or more target objects. In some embodiments, a context set is associated with the one or more target objects, and each of a plurality of target objects is associated with a context set that has the contextual information for the target object. As one illustrative non-limiting example, a context set for a target word balance includes multiple context objects such as one or more semantic definitions, a sentence in which the target word appeared, or a domain or field in which the target word was uttered. As demonstrated from the example, the context set may provide contextual information that is specific to the target word and/or contextual information that is not specific to the target word. According to example embodiments, context sets are intelligently created to enhance data labeling of target objects.

As shown in FIG. 1, the system 100 may include computer system 102, user or client devices 104 (e.g., 104A-104N), or other components. In some embodiments, the computer system 102 may manage data labeling tasks or operations being performed at each of the client devices 104. In particular, the computer system 102 may generally provide or transmit target data to client devices 104, receive labels assigned to the target data to client devices 104, and generate training datasets from the received labels. In some embodiments, labels assigned to target objects represent expected or desired outputs of a ML model when provided with the target objects. Given the labels, the ML model may then be trained to mimic the expected outputs and patterns therein when provided with new inputs. In some examples, the labels depend on the type or application of the ML model. For example, given an image classification ML model, the labels assigned to target images may include descriptions or identifiers for various objects captured in the images (e.g., dog, cat, human). As another example, given a medical risk prediction ML model, the labels assigned to target health records may include quantified risk probabilities (e.g., 30%, 50%, 80%). The computer system 102 may implement various embodiments disclosed herein in order to enhance the labeling at client devices 104 and to generate enhanced training datasets.

The client devices 104A-104N may include other systems or devices that operate within the system 100, in particular, user devices at which data labelers perform labeling tasks. For example, the user devices can communicate with the computer system 102 to receive target objects to be labeled by users, and in some embodiments, the user devices further receive sets of context objects to support the labeling of the target objects. As discussed, target objects may be data to be assigned labels by data labelers, and the target objects may be configured as inputs to a ML model. For example, target objects to be labeled by data labelers for the purposes of training an image classification ML model may include multiple different images, regions of interests within one or more images, sub-images or image slices, and/or the like. As another example, target objects to be labeled by data labelers for the purposes of training a natural language ML Model may include text transcriptions, audio recordings of speech, and/or the like. The user devices may further transmit the labels assigned to the target objects to the computer system 102. In some examples, the user devices may include devices implementing automatic labeling models that are configured and trained to automatically label target objects to support creation of training datasets for other models. Thus, the user devices may receive target objects and context sets to use with automatic labeling models. By way of example, a client device 104 (e.g., one of client devices 104A-104N) may include a desktop computer, a server, a notebook computer, a tablet computer, a smartphone, a wearable device, or other user device.

The client devices 104A-104N may further include other systems or devices that use the ML-based services of the computer system 102 and/or a trained ML model. For example, after the computer system 102 trains the ML model using an enhanced training dataset, client devices 104 can interface (e.g., via an application programming interface) with the ML model (e.g., implemented at the computer system 102, implemented at another system in the system 100) to obtain ML-based inferences and outputs. That is, in some embodiments, ML models trained via enhanced training datasets may be implemented in a service-oriented or service-based architecture.

As illustrated, the system 100 may include database(s) 132, and the database(s) 132 may store a variety of information that may be used in connection with operations performed by components of the system 100 to enhance data labeling. In some embodiments, the database(s) 132 may include a context database 134 which stores context objects that are related to target objects. For example, the computer system 102 may obtain the context objects from the context database 134 to determine context sets and provide context sets at client devices 104. In some embodiments, the database(s) 132 may include a model database 136 which stores machine learning models that may be trained on enhanced training datasets created from enhanced data labeling. In some embodiments, the model database 136 or other databases of the database(s) 132 may store datasets, including enhanced training datasets, testing datasets, validation datasets, and/or the like.

Components of the system 100 may communicate with one or more other components of system 100 via a communications network 150 (e.g., Internet, a mobile phone or telecommunications network, a mobile voice or data network, a cable network, a public switched telephone network, or other types of communications networks or combinations of communications networks). The communications network 150 may be a wireless or wired network.

It should be noted that, while one or more operations may be described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of a client device 104. It should be noted that, although some embodiments are described herein with respect to machine learning models, other intelligence and/or prediction models (e.g., statistical models or other analytics models) may be used in lieu of or in addition to machine learning models in other embodiments (e.g., a statistical model replacing a machine learning model and a non-statistical model replacing a non-machine-learning model, in one or more embodiments).

In the illustrated example, the computer system 102 may include a context determination subsystem 112, a model training subsystem 114, a model testing subsystem 116, or other components, and the components or subsystems of the computer system 102 may implement various functionality and operations described herein.

In some embodiments, the context determination subsystem 112 may determine and provide context sets for target objects at client devices 104. In some embodiments, the context determination subsystem 112 may determine a context set for each target object at each client device 104. The context determination subsystem 112 may determine context sets with different characteristics such that the effect of different characteristics of context sets can be evaluated and used to subsequently (or iteratively) create improved context sets (with respect to improvements to model accuracy and performance). For example, context sets for a given target object that are provided at client devices 104 may differ in that a given context set includes context objects that are not included in at least one other context set. Other characteristics that may be varied across context sets by the context determination subsystem 112 may include a number of context objects in each context set, for example, such that a minimum number of context objects that improves model accuracy can be determined.

In some embodiments, the context determination subsystem 112 may selectively include certain context objects across context sets to determine an effectiveness of the certain context objects. That is, an example characteristic of context sets to be evaluated may be the inclusion of a certain context object. For example, the context determination subsystem 112 may control the inclusion of sensitive or security-related context objects in context sets to determine an effect of said context objects on model accuracy and performance. For example, the context determination subsystem 112 may include a sensitive or security-related context object in a first subset of context sets and not in a second subset of context sets. By doing so, comparison of the downstream effects of the first subset and the second subset of context sets may inform the context determination subsystem 112 on whether the sensitive or security-related context object can be obscured or related without affecting model training. In another example, the context determination subsystem 112 may include a list of possible model outputs in a subset of context sets to determine whether said list benefits data labelers in assigning accurate labels. By doing so, the context determination subsystem 112 can determine whether to include said list in subsequent context sets.

In some embodiments, the context determination subsystem 112 may determine context sets on a device-wise or user-wise basis. For example, the context determination subsystem 112 may determine context sets at a first client device 104 to each have a first number of context objects, and the context determination subsystem 112 may determine context sets at a second client device 104 to each have a second number of context objects. In doing so, subsets of context sets that have different characteristics may correspond to subsets of client devices 104. In some examples, the context determination subsystem 112 may determine context sets to evaluate an effect of characteristics of data labelers to whom the context sets are provided. For example, context sets may be determined and provided to data labelers with different levels of labeling experience (and may have different needs for context) to determine whether different amount of context should be provided to the data labelers for subsequent labeling tasks.

Thus, the context determination subsystem 112 may determine context sets with particular characteristics in order for the computer system 102 to determine an effective, optimal, efficient, and/or secure context set for subsequent data labeling operations or tasks. Manipulation of certain characteristics of context sets by the context determination subsystem 112 may enable observation of downstream effects of different characteristics on model accuracy and performance. Accordingly, in some embodiments, the context determination subsystem 112 may determine context sets based on insights obtained from previous context sets. For example, based on model accuracy scores associated with context sets of a previous iteration, the context determination subsystem 112 may propagate certain set characteristics (e.g., a high number of context objects, inclusion of a particular context object) in subsequently determined context sets. In some embodiments, the context determination subsystem 112 may implement a context determination model (e.g., a machine learning model). Based on historical observations of the effects of different context sets on data labeling and model accuracy, the context determination model may be used by the context determination subsystem 112 to predict a particular context set having characteristics of certain ones of the different context sets. In some embodiments, such observations of the effects of different context sets may be obtained by the context determination subsystem 112 based on operations performed by the model training subsystem 114 and the model testing subsystem 116.

Therefore, with the context determination subsystem 112, the computer system 102 may provide various technical improvements and benefits. With the context determination subsystem 112 determining context sets that are effective in enhancing data labeling, communication load on the network 150 may be improved. For example, by determining certain context objects that are particularly effective, or by determining a least or minimum number of context objects needed to affect model accuracy, more lightweight context sets may be determined and transmitted to client devices 104. Further, through selective inclusion of security-related context objects and evaluation of downstream effects thereof, security of data exchanged across the network 150 to client devices 104 may be improved. For example, based on a determination that providing sensitive context objects does not significantly affect model accuracy, communication of such sensitive context objects during data labeling tasks can be eliminated or reduced.

As discussed, the technical improvements provided via the context determination subsystem 112 may be based on insights resulting from operations performed by the model training subsystem 114 and the model testing subsystem 116. In some embodiments, the model training subsystem 114 may generate training datasets based on labels received in connection with the context sets provided by the context determination subsystem 112, and the model training subsystem 114 may use the training datasets to train instances of a ML model (e.g., copies of the same version of a given ML model). A training dataset generated by the model training subsystem may include the target objects and one or more labels assigned to each target object.

In particular, the model training subsystem 114 may generate different training datasets that correspond to different subsets of context sets, such that a training dataset includes labels received in connection with a corresponding subset of context sets. In some embodiments, the subsets of context sets may be defined according to set characteristics to be evaluated. For example, a first subset of context sets may include context sets having a high number of context objects, while a second subset of context sets may include context sets having a low number of context objects (e.g., defined by a threshold number of context objects). Then, in this example, the model training subsystem 114 may generate a first training dataset with labels received in response to the first subset of context sets being provided, and a second training dataset with labels received in response to the second subset of context sets being provided. In some embodiments, the model training subsystem 114 may generate different training datasets that correspond to different subsets of client devices 104 at which the context sets are provided.

In some examples, the different training datasets generated by the model training subsystem 114 may include different labels for the target objects as an effect of the different context sets being provided to the data labelers. In some embodiments, the model training subsystem 114 may determine that the labels included in the different training datasets are substantially the same (e.g., at least a threshold percentage of labels are the same, a correlation value between the training datasets exceeds a threshold), and the model training subsystem 114 may provide feedback to the context determination subsystem 112 that indicates that the context sets resulted in the substantially the same labels being assigned to the target objects. In some examples, the model training subsystem 114 may generate a number of different training datasets based on different labels received for the target objects. For example, the model training subsystem 114 may generate at least three training datasets based on the computer system 102 receiving at least three different labels for a given target object. In doing so, the model training subsystem 114 may associate a subset of the context sets with a training dataset based on the labels of the training dataset resulting from the subset of the context sets being provided, such that the differences in labeling (across training datasets) can be mapped to differences in context sets.

In some embodiments, the model training subsystem 114 may train multiple instances of a ML model on the multiple training datasets. In some embodiments, the model training subsystem 114 may train the multiple model instances according to consistent training parameters, such that differences in the trained model instances may be more directly attributed to differences in the training datasets, and by extension, in the context sets. For example, the model training subsystem 114 may train the multiple model instances with a consistent number of training iterations, with a same loss function for backpropagation, and/or the like. Therefore, the model training subsystem 114 may provide instances of a ML model each trained on a different training dataset.

In some embodiments, the model testing subsystem 116 may evaluate (e.g., validates and/or tests) the instances of the model instances trained by the model training subsystem 114, and the model testing subsystem 116 may determine an accuracy and/or performance score for each model instance based on the evaluation. In some embodiments, the model testing subsystem 116 may test the multiple model instances according to consistent testing parameters, such that differences in the resulting accuracy score are more directly attributed to differences in the training datasets, and by extension, in the context sets. For example, the model testing subsystem 116 may test the multiple model instances according to a testing dataset, according to a consistent number of test runs, and/or the like. In some embodiments, the testing dataset used to evaluate the model instances may be manually created by a subject matter expert and may be considered as a ground-truth dataset. In some embodiments, the testing dataset may be a training dataset used in a previous iteration of data labeling enhancement, or a combination or partitioning of multiple such training datasets.

In some embodiments, the model testing subsystem 116 may determine an accuracy score for each model instance, and the accuracy score may indicate how accurate the model instance is trained to be. In some examples, the accuracy score may be a p-score or a p-value. The accuracy scores of the model instances may be indicative of the effectiveness of the context sets. In particular, a first accuracy score of a first model instance may be indicative of the effectiveness of characteristics of a first subset of context sets, relative to the effectiveness of characteristics of a second subset of context sets associated with a second model instance having a second accuracy score. In some embodiments, the accuracy scores of model instances and associated with corresponding subsets of context sets may be provided back to the context determination subsystem 112 to inform subsequent determination of context sets.

Figure 2:
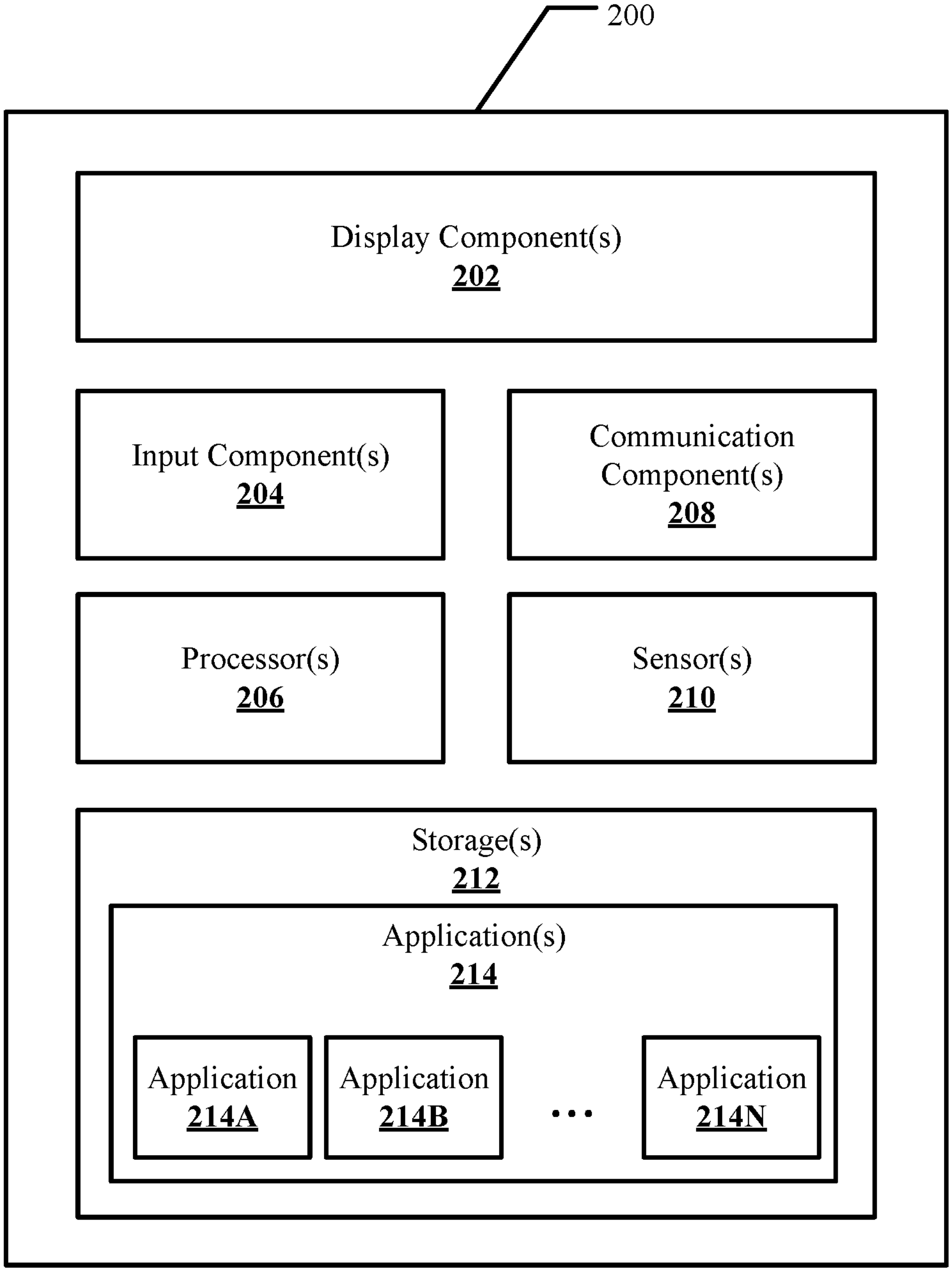
FIG. 2 shows an example computing entity for performing operations to enhance data labeling for machine learning training, in accordance with one or more embodiments.

In some embodiments, with respect to FIG. 2, one or more operations described herein that relate to enhancing data labeling with context sets may be performed by a computing entity 200. In some embodiments, the computing entity 200 may embody the computer system 102 or components thereof (e.g., subsystems 112-116). As illustrated, the computing entity 200 may include a plurality of components, such as display component(s) 202, input component(s) 204, processor(s) 206, communication component(s) 208, sensor (s) 210, storage(s) 212, application(s) 214, or other components. In some embodiments, storage 212 may store a variety of applications 214. For example, applications 214A-214N may represent different applications stored on computing entity 200, and an application 214 may correspond to the performance of various example operations herein. An example application 214 may be configured to determine context sets based on various factors including labeler profiles, ML model configuration, and characteristics of effective context sets. Another example application 214 may be configured to train instances of a ML model on training data sets. Yet another example application 214 may be configured to test instances of a ML model and determine accuracy scores for the instances of the ML model. In various embodiments, communication components 208 may be configured for transmitting target objects and context sets to user devices associated with data labelers, for example.

Figure 3:
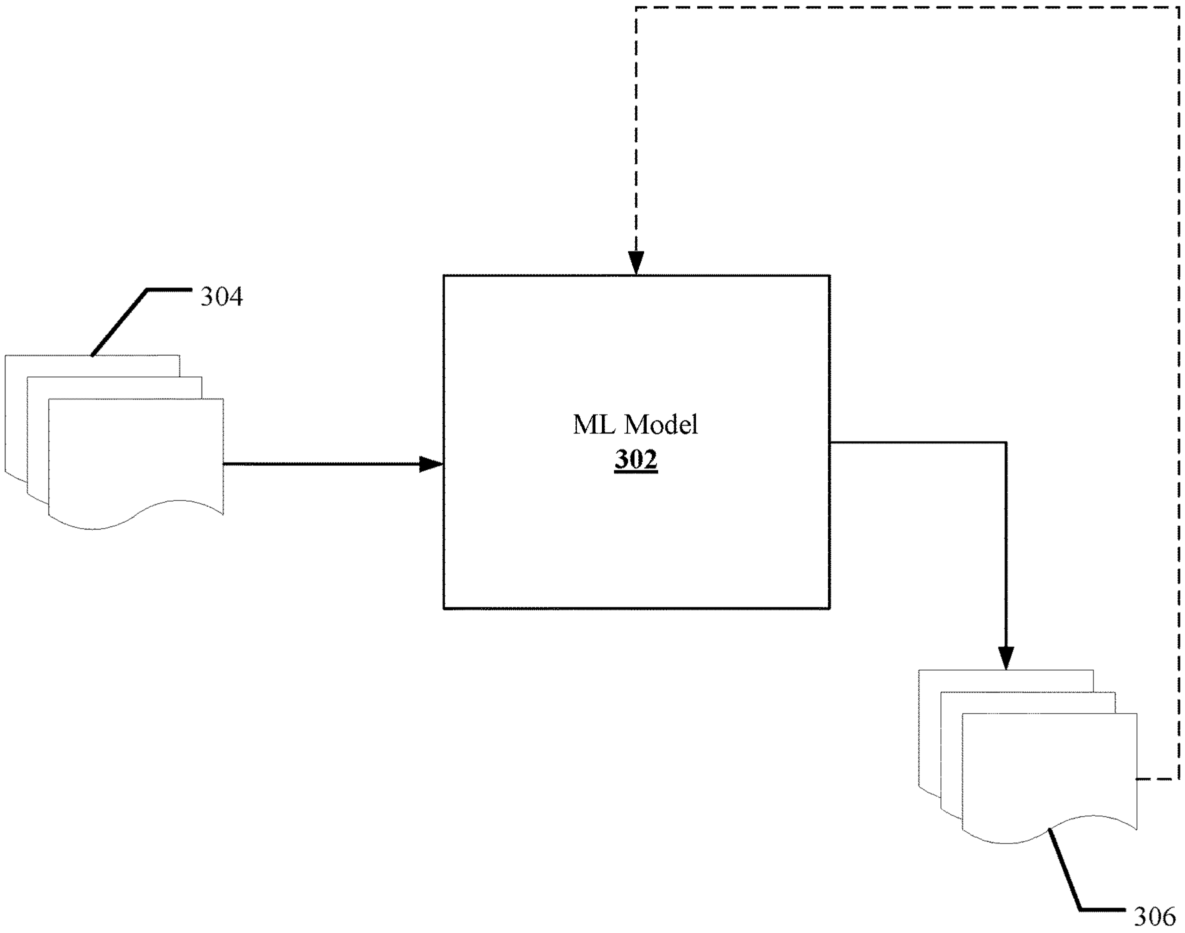
FIG. 3 shows an example machine learning model for which technical benefits are provided based on enhancements to data labeling, in accordance with one or more embodiments.

FIG. 3 shows an example of an ML model 302 that may be trained on an enhanced training dataset and that may be used to create subsequent and improved context sets. In some embodiments, the machine learning or prediction models described herein, such as ML model 302, may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments. each individual neural unit may have a summation function that combines the values of all its inputs together. In some embodiments, each connection (or the neural unit itself) may have a threshold function such that the signal must surpass the threshold before it propagates to other neural units. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion. In some embodiments, data defining neural units and parameters thereof (e.g., weights, biases, hyperparameters) as well as data defining an architecture of a machine learning model (e.g., specific connections or edges between specific neural units, configuration of different layers) may be stored in one or more model databases 136. Training of a model that is defined in a model database 136 may comprise modifying one or more parameters stored within the model database 136.

As illustrated, the ML model 302 may take inputs 304 and provide outputs 306. According to example embodiments, the ML model 302 is trained based on updates to its configurations (e.g., weights, biases, or other parameters) based on an assessment of the outputs 306 with labels assigned to the inputs 304 according to a training dataset. The labels serve as reference feedback information or expected outputs corresponding to the inputs 304. In some embodiments, where machine learning model 302 is a neural network, connection weights may be adjusted to reconcile differences between the outputs 306 and the labels assigned to the inputs 304 according to a training dataset. In some embodiments, one or more neurons (or nodes) of the neural network may require that their respective errors (e.g., a difference between a network output and a label in a training dataset) be sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate predictions that reflect the expected outputs indicated in the training dataset. As previously discussed, inaccuracies in the labels—representing expected outputs and/or reference feedback information—included in a training dataset causes the ML model 302 to be incorrectly trained and produce incorrect outputs that mirror the incorrect reference feedback information. Thus, embodiments disclosed herein provide training datasets that are improved based on providing context data to data labelers, such that the ML model 302 is trained to reflect expected outputs that are accurate.

In some embodiments, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. In some embodiments, each of the multiple portions are trained with respective enhanced training datasets.

The neural network may also include different input layers to receive various input data. Also, in differing examples, data may be input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization.

In a recurrent structure, a node of a layer may be again input to the same node or layer at a subsequent time, while in a bidirectional structure, forward and backward connections may be provided. The links are also referred to as connections or connection weights, as referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives. According to example embodiments, the connections and connection weights are modified based on labels that are included in training datasets that are improved or enhanced using context data.

Figure 4:
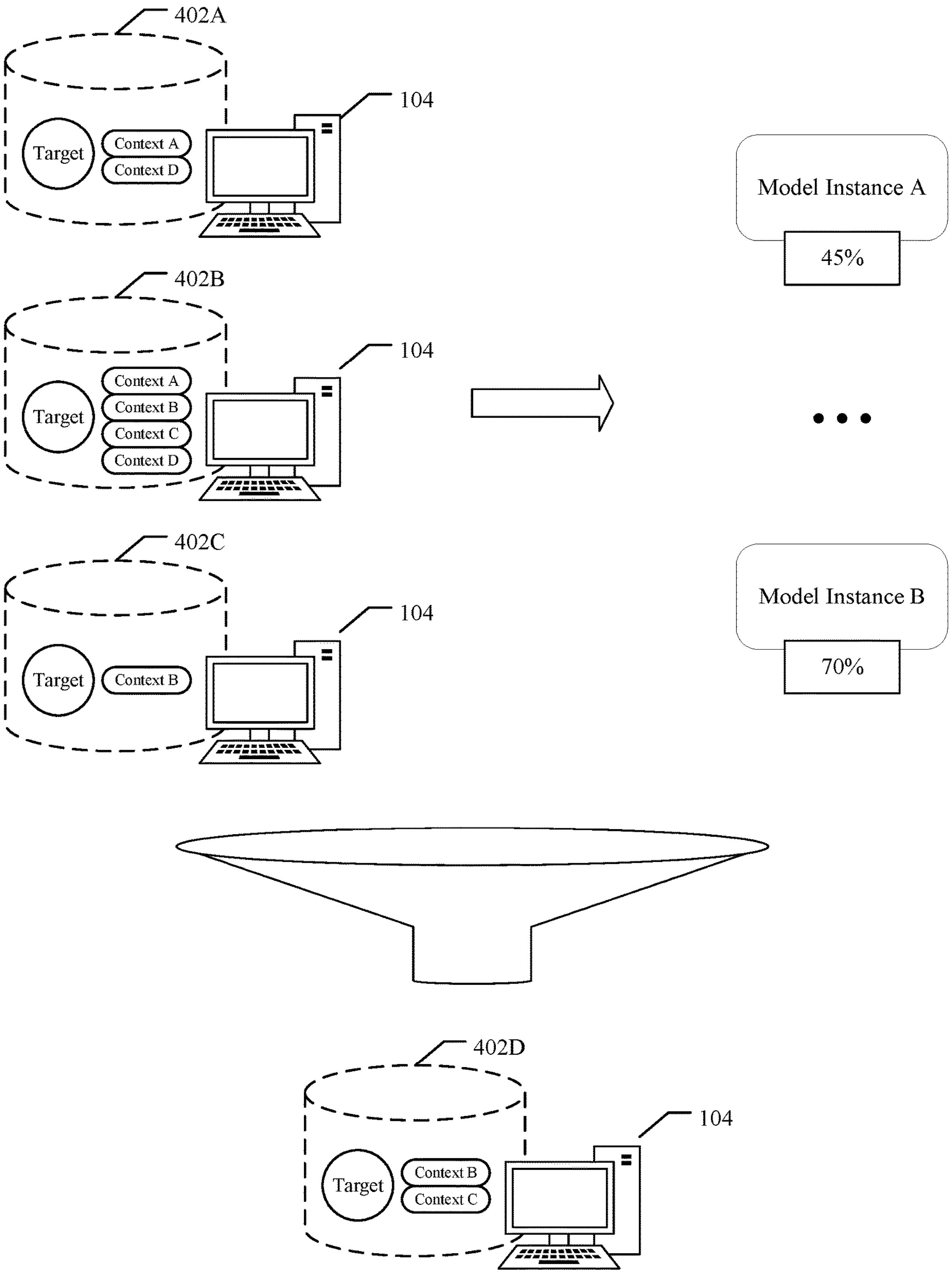
FIG. 4 provides a diagram that shows enhancements to data labeling that include context sets being provided to data labelers, in accordance with one or more embodiments.

FIG. 4 illustrates a diagram that shows how training of a ML model (e.g., ML model 302) may be improved via training datasets that are enhanced by context sets. FIG. 4 illustrates that context sets 402A-402C are provided at client devices 104. In some examples, each context set 402 may be provided at a client device. In other examples, the context sets 402 may be provided at one client device. As illustrated, each of the context sets 402 may include one or more context objects related to a target object to which data labelers are tasked with assigning a label (e.g., an expected model output, reference feedback information). According to examples discussed herein, the context objects may include similar objects to the target object, objects located near the target object, metadata associated with the target object, information related to the ML model to be trained, and/or the like. In the illustrated example, different numbers of context objects may be provided.

Providing the different context sets 402 may lead to multiple instances of a ML model being trained. Each instance may be trained on a training dataset built from labels received from a subset of the context sets 402. As one example, a first model instance may be trained on a first training dataset built from labels received in connection with the first context set 402A and the third context set 402C, while a second model instance is trained on a second training dataset built from labels received in connection with the second context set 402C. That is, the first training dataset is built from labels that data labelers assign to target objects while being provided with the first context set 402A. Likewise, the second training dataset is built from labels received from data labelers to whom the second context set 402C is provided. In doing so, in the illustrated example, the first training dataset may include labels resulting from small context sets, while the second training dataset may include labels resulting large context sets, such that the downstream effects of context set size can be observed.

As another example, a first model instance may be trained on a first training dataset built from labels received in connection with the second context set 402B and the third context set 402C (both including a particular context object "Context B"), while a second model instance may be trained on a second training dataset built from labels received in connection with the first context set 402A (not including the particular context object "Context B"). In doing so, a determination of the effectiveness of the particular context object "Context B" can be performed based on evaluating the two model instances.

While the examples discussed herein involve a first model instance and second model instance, it will be appreciated that any number of model instances and training datasets may be used. For example, four training sets may be created to test both characteristics of context sets described in the above examples.

The multiple instances of the ML model may be evaluated to determine an accuracy score. In the illustrated example, the first model instance may be evaluated to have a 45% accuracy, while the second model instance may be evaluated to have a 70% accuracy. This suggests that characteristics of a second subset of context sets that resulted in labels of a second training dataset on which the second model instance was trained may be more effective than characteristics of a first subset of context sets associated with the first model instance. As illustrated, such effective characteristics may be distilled and propagated for subsequent context sets (e.g., context set 402D) for subsequent data labeling tasks. That is, the effective characteristics that are determined from model training and evaluation may be used to improve subsequent data labeling tasks.

For example, the subsequent context set 402D may include the particular context object "Context B" based on "Context B" being exclusively included in context sets associated with the second model instance. As another example, the subsequent context set 402D may include a fewer number of context objects (e.g., two) based on the context sets associated with the second model instance including fewer context objects compared to context sets associated with the first model instance. As demonstrated, successful context set characteristics may be selected and propagated for subsequent context sets.

Figure 5:
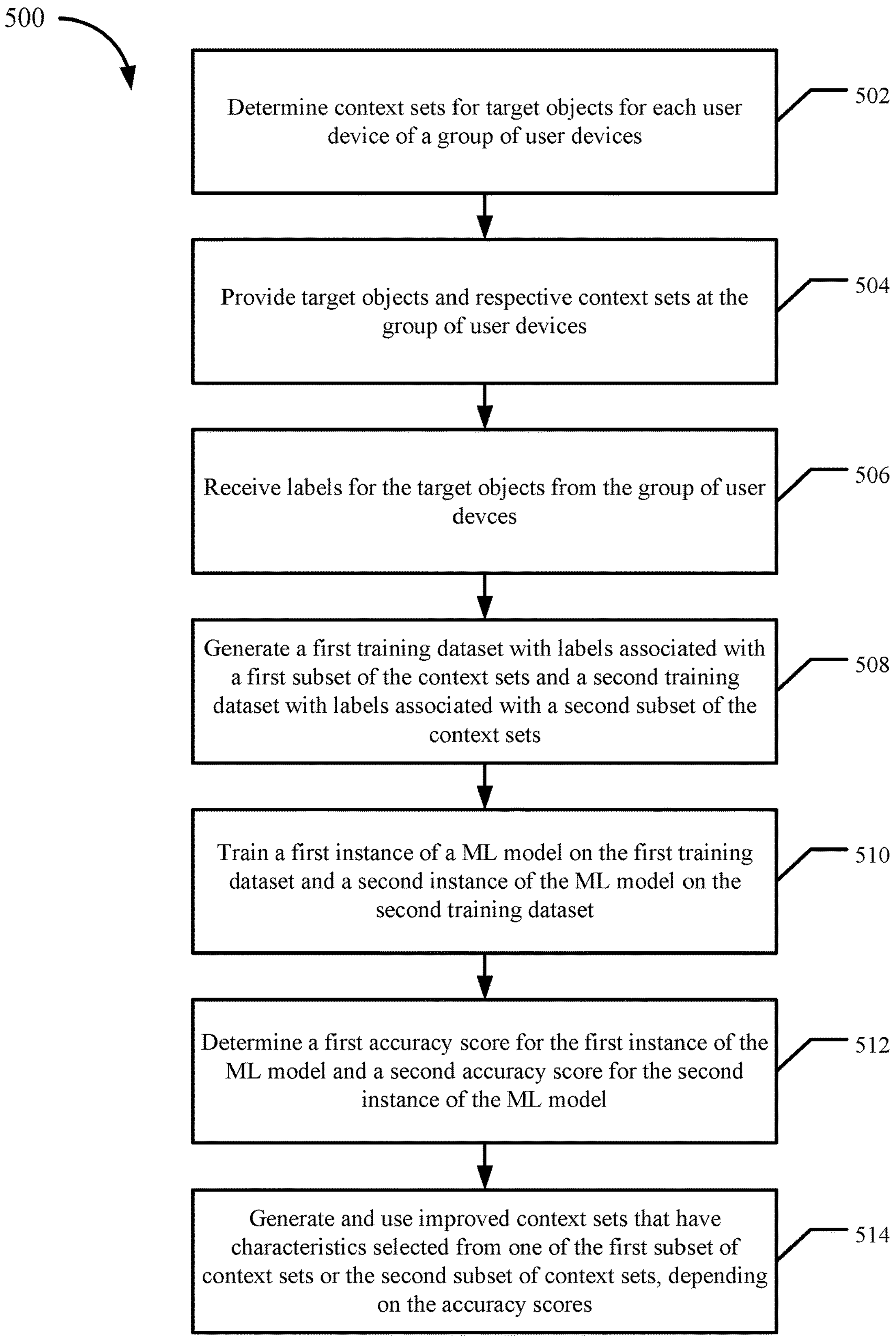
FIG. 5 shows a flowchart of example operations for enhancing data labeling for machine learning training based on determining context sets to provide to data labelers during a labeling task, in accordance with one or more embodiments.

FIG. 5 is an example flowchart of processing operations of a method 500 that enables the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In some embodiments, the method 500 may be performed in response to a determination to improve domain-specificity of a ML model (e.g., training the ML model to interpret the ambiguous word balance in a financial account context, training the ML model). In some embodiments, the method 500 may be performed as part of a training pipeline for ML models. In some embodiments, the method 500 may be performed in response to a determination (e.g., a manual determination) that a training dataset includes incorrect or inaccurate labels. In some embodiments, the method 500 may be performed in response to, for a given target object, receiving a plurality of different labels assigned to the given target object from different data labelers.

In an operation 502, the system may determine context sets for target objects for a group of user devices. In some embodiments, the system may determine a context set for each target object at each user device, and the context set may include context objects related to the target object. In some examples, the plurality of target objects to be labeled may be the same across the user devices, and the context sets at a given user device may be determined on a labeler-wise or device-wise basis. In some examples, the context sets may be uniformly determined to isolate or control for differences in data labelers. In some examples, the context sets may be randomly determined as an initial iteration of determining an optimal context set. In some embodiments, the system may determine the context sets to be different, such that different effects of different context sets may be observed. For example, a given context set may include context objects that are not included in at least one other context set.

In an operation 504, the system may provide the target objects and respective context sets at the group of user devices. In some embodiments, the system may transmit the target objects and the respective context sets to each user device. In some embodiments, the system may cause display of an indication of a target object and a respective context set at a user device to enable the user at the user device to assign a label for the target object based on the respective context set. Then, in an operation 506, the system may receive labels for the target objects from the group of user devices.

In an operation 508, the system may generate a first training dataset with labels received in connection with a first subset of the context sets. The system may further generate a second training dataset with labels received in connection with a second subset of the context sets. In some embodiments, the first training dataset may include labels received from a first subset of user devices, and the second training dataset may include labels received from a second subset of user devices. In some embodiments, the first subset and the second subset of context sets may be defined based on characteristics of the context sets. For example, the first subset includes context sets with a high number of context objects, while the second subset includes context sets with a lower number of context objects. By doing so, context set characteristics may be distinct between the first training dataset and the second training dataset, enabling comparison thereof. In some embodiments, these differences in context set characteristics between training datasets may result in different labels being assigned to target objects across different training datasets. In some embodiments, in response to the first and the second training dataset being substantially similar, new context sets may be determined and provided to the user devices to obtain new labels.

In an operation 510, the system may train a first instance of a ML model on the first training dataset and a second instance of the ML model on the second training dataset. That is, each training dataset may be used to train a different instance of the ML model. In some embodiments, the first instance and the second instance may be trained on respective training datasets for a consistent number of iterations, a consistent loss function, and/or the like.

In an operation 512, the system may determine a first accuracy score for the first instance of the ML model and a second accuracy score for the second instance of the ML model. Thus, the different instances of the ML model may be evaluated and tested such that the different effects on model accuracy and performance by the different training dataset can be observed. In some embodiments, the accuracy scores may be p-scores, specificity and/or sensitivity values, and/or the like. In some embodiments, the first instance and the second instance may be tested on the same testing dataset.

In an operation 514, the system may generate and use improved context sets that have characteristics selected from one of the first subset of context sets or the second subset of context sets based on whichever accuracy score is higher. For example, if the first accuracy score is greater than the second accuracy score, characteristics of the first subset of context sets may be selected and propagated for subsequent context sets. Such characteristics may include inclusion of a particular context object, correlation with data labeler characteristic, a number or volume of context objects, and/or the like.

In some embodiments, use of the improved context sets may include providing (e.g., transmitting) the improved context sets to the user devices as another iteration of enhanced data labeling, and the operations 504-514 may be performed again, for example. In some embodiments, use of the improved context sets may include providing (e.g., transmitting) the improved context sets to the user devices to create a final training dataset to train the ML model for deployment. In some embodiments, use of the improved context sets may include providing (e.g., transmitting) the improved context sets to the user devices to create a validation or testing dataset with more accurate labels. In some embodiments, use of the improved context sets may include providing the improved context sets to an automatic labeling model to automatically generate a training dataset. These and other uses of improved context sets are contemplated.

In some embodiments, the various computers and subsystems illustrated in FIG. 1 may include one or more computing devices (e.g., computing entity 200 shown in FIG. 2) that are programmed to perform the functions described herein. The computing devices may include one or more electronic storages (e.g., storage(s) 212 as illustrated in FIG. 2), one or more physical processors programmed with one or more computer program instructions (e.g., processor(s) 206 as illustrated in FIG. 2), and/or other components. The computing devices may include communication lines or ports to enable the exchange of information within a network or other computing platforms via wired or wireless techniques (e.g., Ethernet, fiber optics, coaxial cable, Wi-Fi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; and/or other mechanisms for configuring processing capabilities on the processors.

Although various embodiments of the present disclosure have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques may be better understood with reference to the following enumerated embodiments:

1. A method comprising: providing context sets for target objects at a group of user devices; in response to obtaining labels (e.g., classifications, object identifiers, a scaled or biased value) for the target objects (e.g., utterances, images, audio snippets, signals), generating a first training dataset with labels obtained in connection with a first subset of context sets and a second training dataset with labels obtained in connection with a second subset of context sets; determining a first accuracy score for a first instance of a ML model trained on the first training dataset and a second accuracy score for a second instance of a ML model trained on the second training dataset; generating second context sets for subsequent target objects (e.g., utterances, images, audio snippets, signals) based on characteristics (e.g., a least number of context objects in a context set, an average number of context objects in each context set, specific context objects, context objects related to users of the user devices, context objects related to the ML model) of the first subset of context sets, in response to the first accuracy score being greater than the second accuracy score; and providing the second context sets with the subsequent target objects at a user device (e.g., transmitting the subsequent target objects with the second context sets to the user device, causing the subsequent target objects and the second context sets to be displayed at the user device).
2. The method of the preceding embodiment, wherein providing context sets includes determining a context set for each target object at each user device, wherein the context set includes context objects related to the respective target object that are not included in at least one other context set of the first context sets.
3. The method of any of the preceding embodiments, wherein the context set for each target object at each user device is determined based on a user profile associated with the user device that includes a number of labeling operations previously performed at the user device (e.g., a labeling experience level of the user at the user device), and wherein the second context sets are generated to be specific to user profiles based on which the first context sets are determined (e.g., at least one characteristic of the second context sets is unique to the user device at which the second context sets are provided).
4. The method of any of the preceding embodiments, wherein the first accuracy score and the second accuracy score are determined based on executions of the first instance of the ML model and the second instance of the ML model on a testing dataset (e.g., a "ground-truth" dataset generated by a subject matter expert user, a dataset generated by a validated model, a training dataset from a previous iteration and determined to have at least a threshold accuracy).
5. The method of any of the preceding embodiments, wherein at least one of the context sets includes a set of candidate model outputs of the ML model (e.g., different animals identified by an image classification ML model, sample responses output by an IVR or conversational ML model), and wherein generating the second context sets includes including the set of candidate model outputs in the second context sets in response to the at least one of the first context sets being included in at least one of the first subset of context sets.
6. The method of any of the preceding embodiments, further comprising: identifying a security-related object (e.g., personally-identifiable information related to a target object, a password, a healthcare record, sensitive account information) that is related to target objects; including the security-related object in the context sets for a particular user device; and in response to at least some of the labels in the second training dataset originating from the particular user device, obscuring the security-related object from the second context sets (e.g., including the security-related object in the context sets did not result in higher model accuracy).
7. The method of any of the preceding embodiments, further comprising: in response to the labels obtained in connection with the first subset of context sets being substantially similar to the labels obtained in connection with the second subset of context sets (e.g., a threshold percentage of same labels, a threshold correlation value), modifying the second subset of context sets (e.g., modifying a number of context objects included in each context set, modifying which context objects are included in each context set); providing the modified context sets at the user devices to obtain new labels; and generating (or re-generating) the training datasets based on the new labels.
8. The method of any of the preceding embodiments, wherein providing the second context sets includes providing the second context sets to an automatic labeling model configured to automatically generate a training dataset.
9. A tangible, non-transitory, machine-readable medium storing instructions that, when executed by a data processing apparatus, cause the data processing apparatus to perform operations comprising those of any of the foregoing method embodiments.
10. A system comprising: one or more processors; and memory storing instructions that, when executed by the processors, cause the processors to effectuate operations comprising those of any of the foregoing method embodiments.

What is claimed is:

1. A system for improving machine learning model accuracy by enhancing context sets used in labeling data objects, the system comprising:

memory storing computer program instructions; and one or more processors configured to execute the computer program instructions to effectuate operations comprising:

providing, to a first user device deploying a first instance of a labeling model, a target object and a first context set comprising a first set of context objects to be used to label the target object;

providing, to a second user device deploying a second instance of the labeling model, the target object and a second context set comprising a second set of context objects to be used to label the target object;

storing, in a database, (i) a first training dataset comprising the target object and a first set of labels for the target object, received from the first user device, in connection with a first subset of context objects of the first set of context objects, and (ii) a second training dataset comprising the target object and a second set of labels for the target object, received from the second user device, in connection with a second subset of context objects of the second set of context objects;

executing, on a testing dataset, (a) a first instance of a machine learning model trained using the first training dataset to determine a first accuracy score of the first instance of the machine learning model and (b) a second instance of the machine learning model trained using the second training dataset to determine a second accuracy score of the second instance of the machine learning model;

based on the first accuracy score being greater than the second accuracy score, extracting characteristics of the first subset of context objects to generate a third context set comprising a third set of context objects optimized for labeling of a set of target objects; and training a third instance of the machine learning model using a third training dataset comprising the set of target objects and a set of labels received from the first user device and the second user device in connection with the set of target objects and the third context set being provided to the first user device and the second user device.

2. The system of claim 1, wherein the target object and the first context set are input to the first instance of the labeling model to obtain the first set of labels for the target object and the target object and the second context set are input to the second instance of the labeling model to obtain the second set of labels for the target object.

3. The system of claim 1, wherein: the characteristics comprise at least one of: (i) a number of context objects included in the first context set or (ii) an average number of context objects included in the first set of context objects and the second set of context objects, and the third context set comprises a same quantity of context objects as at least one of the number of context objects or the average number of context objects.

4. The system of claim 1, wherein:

the first context set is provided to the first user device based on a first profile associated with the first user device comprising a number of labeling operations previously performed at the first user device and the second context set is provided to the second user device based on a second profile associated with the second user device comprising a second number of labeling operations previously performed at the second user device.

5. A method comprising:

sending (i), to a first user device, a first set of target objects to be labeled and a first context set selected from a plurality of context sets related to the first set of target objects, and (ii), to a second user device, the first set of target objects and a second context set of the plurality of context sets, wherein the plurality of context sets comprise context objects that are related to the first set of target objects and are selected based on a use case of a machine learning model to be trained;

storing, in a database, for training of the machine learning model, a first training dataset comprising first labels assigned to the first set of target objects based in connection with the first context set and a second training dataset comprising second labels assigned to the first set of target objects in connection with the second context set;

executing, on a test dataset, a first instance of the machine learning model, trained on the first training dataset, to obtain a first accuracy score and a second instance of the machine learning model trained, on the second training dataset, to obtain a second accuracy score;

based on the first accuracy score being greater than the second accuracy score, propagating one or more characteristics of the first context set to generate a third context set for labeling second target objects;

providing, to the first user device and the second user device in connection with a labeling task for the second target objects the third context set, to obtain a third training dataset comprising the second target objects and a set of labels for the second target objects; and training a third instance of the machine learning model using the third training dataset.

6. The method of claim 5, wherein sending the first set of target objects and the first context set comprises:

providing, to a labeling model, via the first user device, (i) the first set of target objects to be labeled and (ii) the first context set to generate the first labels; and storing, in the database for training of the machine learning model, the first labels.

7. The method of claim 5, further comprising:

evaluating, the characteristics of the first context set, wherein the one or more characteristics comprise at least one of: (i) a least number of context objects included in the plurality of context sets, or (ii) an average number of context objects included in the plurality of context sets; and generating the third context set to include a number of context objects that is based on the at least one of the least number of context objects or the average number of context objects.

8. The method of claim 5, further comprising:

generating the first context set for the first user device based on a profile associated with the first user device; and generating the second context set to be specific to a particular profile associated with the second user device.

9. The method of claim 5, further comprising:

obtaining a number of labeling operations previously performed at the first user device; and generating the first context set provided at the first user device to include a number of context objects based on the number of labeling operations previously performed at the first user device.

10. The method of claim 5, further comprising:

s obtaining a set of candidate model outputs of the machine learning model in the first context set; and generating the third context set comprising at least a subset of the set of candidate model outputs in the third context set in response to at least a subset of the first context set being included in the third context set.

11. The method of claim 5, further comprising:

determining that the first training dataset and the second training dataset are substantially similar;

sending new context sets to the first user device and the second user device; and re-generating the first training dataset and the second training dataset based on new labels received from the first user device and the second user device in response to the new context sets.

12. The method of claim 5, further comprising:

identifying a security-related object that is related to the first set of target objects to be labeled;

including the security-related object in the first context set; and in response to the first context set being included in the second context set, obscuring the security-related object from the second context set.

13. One or more non-transitory computer-readable media comprising instructions that, when executed by one or more processors, cause operations comprising:

storing, in a database for training a machine learning model, (i) a first training dataset comprising one or more target objects and first labels that are assigned to the one or more target objects based on a first set of context objects related to the one or more target objects and that are selected based on a use case of the machine learning model (ii) a second training dataset comprising the one or more target objects and second labels that are assigned to the one or more target objects based on a second set of context objects related to the one or more target objects and that are selected based on the use case of the machine learning model;

training a first instance of the machine learning model on the first training dataset and a second instance of the machine learning model on the second training dataset to obtain a first trained machine learning model and a second trained machine learning model, respectively;

executing the first trained machine learning model and the second trained machine learning model on a testing dataset to calculate a first performance score and a second performance score, respectively;

based on the first performance score being greater than the second performance score, generating a third set of context objects for labeling a set of target objects using characteristics of the first set of context objects; and training a third instance of the machine learning model using a third training dataset comprising a set of target objects and third labels that are assigned to the set of target objects based on a third set of context objects derived using characteristics of the first set of context objects.

14. The one or more non-transitory computer-readable media of claim 13, wherein the operations further comprise:

evaluating the characteristics of the first set of context objects to calculate a number of context objects included in the first set of context objects; and generating the third set of context objects based on the characteristics of the first set of context objects.

15. The one or more non-transitory computer-readable media of claim 13, wherein the operations further comprise:

receiving the first labels from a first data labeling device to which the first set of context objects are provided, wherein the first set of context objects is determined based on a first profile associated with the first data labeling device; and receiving the second labels from a-second data labeling device to which the second set of context objects are provided, wherein the second set of context objects is determined based on a second profile associated with the-second data labeling device.

16. The one or more non-transitory computer-readable media of claim 13, wherein the operations further comprise;

based on previous labeling operations, generating the first set of context objects to comprise a first number of context objects and the second set of context objects to comprise a second number of context objects.

17. The one or more non-transitory computer-readable media of claim 13, wherein the operations further comprise:

in response to the first set of context objects including a set of candidate model outputs of the machine learning model, generating the third set of context objects to include the set of candidate model outputs.

18. The one or more non-transitory computer-readable media of claim 13, wherein the operations further comprise:

receiving the first labels from a first data labeling device and the second labels from a second data labeling device;

in response to determining that the first labels are substantially similar to the second labels, modifying a number of context objects included in the second set of context objects; and providing the second set of context objects to a third data labeling device to obtain new second labels.

19. The one or more non-transitory computer-readable media of claim 13, wherein the operations further comprise:

including a security-related object related to a set of target objects in the second set of context objects and not in the first set of context objects; and in response to the first performance score being greater than the second performance score, generating the third set of context objects to exclude the security-related object.

* * * * *